United States Patent
Thiebolt, III et al.

(10) Patent No.: US 6,174,622 B1
(45) Date of Patent: Jan. 16, 2001

(54) PROCESS FOR FABRICATION OF LOW BASIS WEIGHT ELECTRODE ACTIVE BLANKS

(75) Inventors: William C. Thiebolt, III, Tonawanda; Douglas P. Eberhard, Grand Island; Jeffrey C. Grisante, Wheatfield, all of NY (US)

(73) Assignee: Wilson Greatbatch Ltd., Clarence, NY (US)

( * ) Notice: Under 35 U.S.C. 154(b), the term of this patent shall be extended for 0 days.

(21) Appl. No.: 09/295,963

(22) Filed: Apr. 21, 1999

(51) Int. Cl.$^7$ .................................................. H01M 4/36
(52) U.S. Cl. .................. 429/217; 429/219; 429/220; 429/221; 429/223; 429/224; 429/231.5; 429/231.8; 429/231.95
(58) Field of Search .................... 429/217, 219, 429/220, 221, 223, 224, 231.5, 231.8, 231.95

(56) References Cited

U.S. PATENT DOCUMENTS

| | | |
|---|---|---|
| 4,161,063 | 7/1979 | Goebel et al. . |
| 4,179,799 | 12/1979 | Fritts . |
| 4,310,609 | 1/1982 | Liang et al. . |
| 4,324,828 | 4/1982 | Ebato et al. . |
| 4,448,605 | 5/1984 | Mizuhara . |
| 4,556,618 | 12/1985 | Shia . |
| 4,812,376 | 3/1989 | Rudolph . |
| 4,830,940 | 5/1989 | Keister et al. . |
| 4,956,247 | 9/1990 | Miyazaki et al. . |
| 5,041,199 | 8/1991 | Di Franco . |
| 5,158,722 | 10/1992 | Ilic et al. . |
| 5,435,874 | 7/1995 | Takeuchi et al. . |
| 5,571,640 | 11/1996 | Takeuchi et al. . |
| 5,698,342 | * 12/1997 | Klein ................................... 429/223 |

* cited by examiner

Primary Examiner—Leo B. Tentoni
(74) Attorney, Agent, or Firm—Hodgson Russ Andrews Woods & Goodyear LLP

(57) ABSTRACT

The present invention is directed to the realization that the dimensions and basis weight of an electrode active admixture such as a transition metal oxide, and particularly silver vanadium oxide, formed into an electrode structure from an admixture paste subjected to a calendering process are influenced by the calender direction. To obtain electrode structures of a desired low basis weight requires a secondary calendering step performed in a direction reverse or orthogonal to that used to form the initial sheet tape. Orthogonal or reverse feed of the electrode active admixture provides for fibrillation of the fluoro-polymeric binder in other than the initial direction. This lets the binder spread in directions transverse to the initial direction to form the low basis weight electrode active structure.

22 Claims, 3 Drawing Sheets

PROCESS FOR FABRICATION OF LOW BASIS WEIGHT ELECTRODE ACTIVE BLANKS

BACKGROUND OF THE INVENTION

1. Field of the Invention

The present invention relates to the conversion of chemical energy to electrical energy, and more particularly, to an alkali metal electrochemical cell having a positive electrode preferably comprising a transition metal oxide calendered into electrode blanks or plates for subsequent processing into an electrode.

2. Prior Art

Related U.S. Pat. Nos. 5,435,874 and 5,571,640, both to Takeuchi et al., which are assigned to the assignee of the present invention and incorporated herein by reference, are directed to a process for manufacturing a free-standing sheet of cathode material. The process involves first adjusting the particle size of the cathode active material to a useful size followed by mixing with binder and conductivity enhancing additives suspended in a solvent to form a paste. The paste is fed into a series of roll mills which calender the paste into a sheet form. Alternatively, the paste is first pelletized before being subjected to the calendering step. The resulting cathode sheet material is dried and punched into blanks that are subsequently contacted to a current collector to form an electrode.

The step of calendering or compacting the paste or, alternatively, the pelletized cathode active material, is performed by two to four calender mills which serve to sequentially press the active admixture into a tape of a free-standing sheet having a thickness in the range of about 0.004 inches to about 0.020 inches. The sequential calendering step is performed by running the tape from one roll mill to the next with the roll mills contacting the cathode active material along a single direction of travel or direction of contact.

The preferred cathode active materials described in the Takeuchi et al. patents are silver vanadium oxide (SVO) and copper silver vanadium oxide (CSVO), which are coupled with a lithium anode and activated by a nonaqueous electrolyte to provide a cell. These high energy density cells are particularly useful as the power source for an implantable medical device such as a cardiac defibrillator.

SUMMARY OF THE INVENTION

The present invention relates to an improved process for providing blanks or plates of electrode active material wherein the tape made by the prior art process is subsequently calendered in a secondary rolling step, substantially orthogonal to the direction at which the first calendering step occurred or at a second direction, opposite the first. This secondary calendering step yields an electrode admixture having a surface area greater than that which is provided by the prior art method having the active material calendered in only one direction, regardless of the number of sequentially reduced gaps the material is run through. The resulting calendered electrode admixture is useful for constructing electrodes for both primary and secondary electrochemical cells.

These and other aspects of the present invention will become more apparent to those skilled in the art by reference to the following description and to the appended drawings.

DESCRIPTION OF THE DRAWING FIGURES

DESCRIPTION OF THE PREFERRED EMBODIMENTS

The method of the present invention begins with an already prepared electrode active starting material such as of a kind typically used as a cathode in a primary electrochemical cell or as the cathode or anode of a secondary electrochemical cell, but not limited thereto. The method involves manufacturing a blank and then an electrode from the active material for use in an electrochemical cell. The active material preferably comprises a metal, a metal sulfide, a metal oxide or a mixed metal oxide, preferably present in a granular form. Carbonaceous active materials are also useful as starting materials for forming electrode components by the process of the present invention.

Examples of active materials that may be formed into a cathode for a primary cell according to the present invention include silver vanadium oxide (SVO), copper silver vanadium oxide (CSVO), manganese dioxide, carbon, fluorinated carbon, titanium disulfide, cobalt oxide, nickel oxide, copper vanadium oxide, and other active materials typically used in lithium anode cells. The active material for a secondary cell is preferably lithiated when the cell is manufactured and may or may not be used in combination with other metal oxide or metal sulfide materials. Lithiated materials are preferred because they are stable in air and readily handled. The more preferred oxides include $LiNiO_2$, $LiMn_2O_4$, $LiCoO_2$, $LiCo_{0.92}Sn_{0.08}O_2$ and $LiCo_{1-x}NiO_2$. Among these, lithium cobalt oxide is most preferred.

Figure 1:
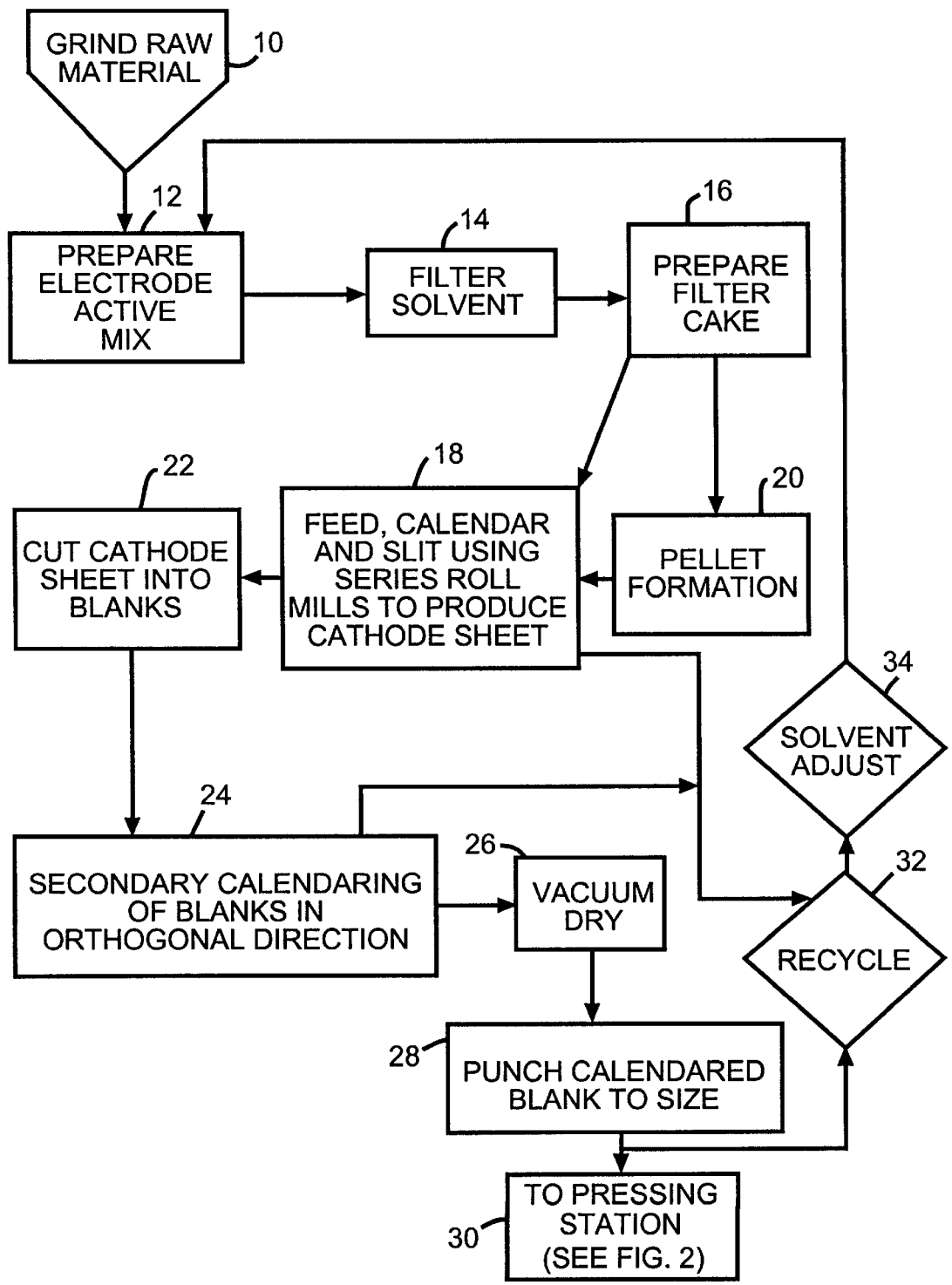
FIG. 1 is a block diagram and flow chart illustrating the steps involved in making an electrode active blank according to the present invention.

As illustrated in the block diagram flow chart in FIG. 1, the method of the present invention starts by taking granular electrode active material and adjusting the particle size to a useful range. This is done by comminuting the active material in an attrition or grinding step 10 to reduce the particle size. A ball mill or vertical ball mill is preferred and typical grinding time ranges from between about 10 to 15 minutes. The finely divided active material is preferably mixed with carbon black and/or graphite as conductive diluents and a powder fluoro-resin such as polytetraflauoroethylene powder as a binder material to form a depolarizer admixture in the step designated 12. Preferably, the admixture comprises about 3 weight percent of the conductive diluent and about 3 weight percent of the binder material. This is typically done in a solvent of either water or an inert organic medium such as mineral spirits. The mixing process provides for the fibrillation of the fluoro-resin to ensure material integrity. In some cases, no conductor material is required and the cathode active material is preferably held between about 80 percent to about 99 percent. After mixing sufficiently to ensure homogeneity in the admixture, the active admixture is removed from the mixer as a paste.

Following the mixing step, the solvent is vacuum filtered 14 from the paste to adjust the solvent content to about 0.25 cc to about 0.35 cc per gram of solids, i.e., the solids comprising the electrode active material, the conductive diluent and the binder. The resulting filter cake 16 is fed into a series of roll mills that compact the active admixture into a thin sheet having a tape form 18, or the active filter cake is first run through a briquette mill in the step designated 20. In the latter case, the active admixture is formed into small pellets which are then fed into the roll mills.

Typically, the compacting step 18 is performed by roll mills comprising two to four calendar mills that serve to press the admixture between rotating rollers to provide a free-standing sheet of the active material as a continuous tape. The tape preferably has a thickness in the range of from between about 0.004 inches to about 0.020 inches. The outer edges of the tape leaving the rollers are trimmed and the resulting tape is cut into blanks or plates 22. According to the present invention, the blanks are further subjected to a secondary calendering step 24 to provide for fibrillation of the fluoro-polymeric binder material in a second direction, other than the first direction. Preferably, the second direction is either orthogonal to or reverse to that which formed the free-standing sheet in step 18.

In a broader sense, however, the secondary step is in any direction other than the first direction to provide the electrode active blanks having a second thickness less than the first thickness. It is believed that when the electrode active admixture is calendered in a single direction the binder is fibrillated to an extent near its maximum tensile strength. If the electrode active blank is calendered in a secondary direction, the active admixture spreads in directions other than, and preferably transverse to, the initial direction to form the low basis weight blanks of the present direction. Accordingly, the secondary calendering step forms blanks having a higher surface area and a lower basis weight, defined as grams/in$^2$ of the cathode active admixture, than the sheet material formed from the primary calendering step according to the prior art.

The thusly formed blanks are subsequently subjected to a drying step under vacuum conditions. The drying step serves to remove any residual solvent and/or water from the active material. Alternatively, the process can include the dropwise addition of a liquid electrolyte into the active mixture prior to the initial calendering step 18 to enhance the performance and rate capacity of an assembled electrochemical cell incorporating the active material.

The active blanks can be stored for later use, or fed on a conveyor belt as shown at 28 to a punching machine. The punching operation forms the active blanks into any dimension needed for preparation of an electrode component for use in a high energy density electrochemical cell, as is well known by those of ordinary skill of the art. As will be described in greater detail hereinafter with respect to FIG. 2, the blanks are moved to the pressing stations 30 where the electrode component is formed.

As further shown in FIG. 1, the method of the present invention contains several feedback loops that serve to recycle the electrode active material should the quality control not be up to an acceptable level. This contributes to the process yield as very little active material is actually lost to waste. After the active admixture is pressed during step 18 by the series of calendar mills, if the resulting tape is too thin or otherwise of insufficient quality, the tape is sent to a recycler, indicated as step 32, that reintroduces the active admixture into the feed line entering the calendar mills. If needed, the solvent concentration is adjusted during step 34 as needed, to provide a more uniform consistency to the admixture paste for rolling into the tape in step 18 and for subsequently forming the blanks in step 24. This first recycle step 32 is also useful for reintroducing trimmings and similar leftover active material back into the feed line entering the calendar mills.

A second recycle loop removes the active material from the process after the secondary calendering step 24 and feeds back into the first calendar mills 18, through the recycler indicated in step 32 and the briquette mill in step 20, if that latter step is included in the process, as previously discussed. Again, the solvent concentration is adjusted during step 34 to produce a paste and filter cake 16 which is suitable for rolling into a tape 18 and that is subsequently processed into blanks 24 according to the present invention.

The punching operation 28 serves to cut the secondarily calendered blanks into a variety of shapes including strips, half-round shapes, rectangular shapes, oblong pieces, or others, that are moved during step 30 to the pressing stations for fabrication of an electrode component for use in a high energy density electrochemical cell, as will presently be discussed in detail.

Figure 2:
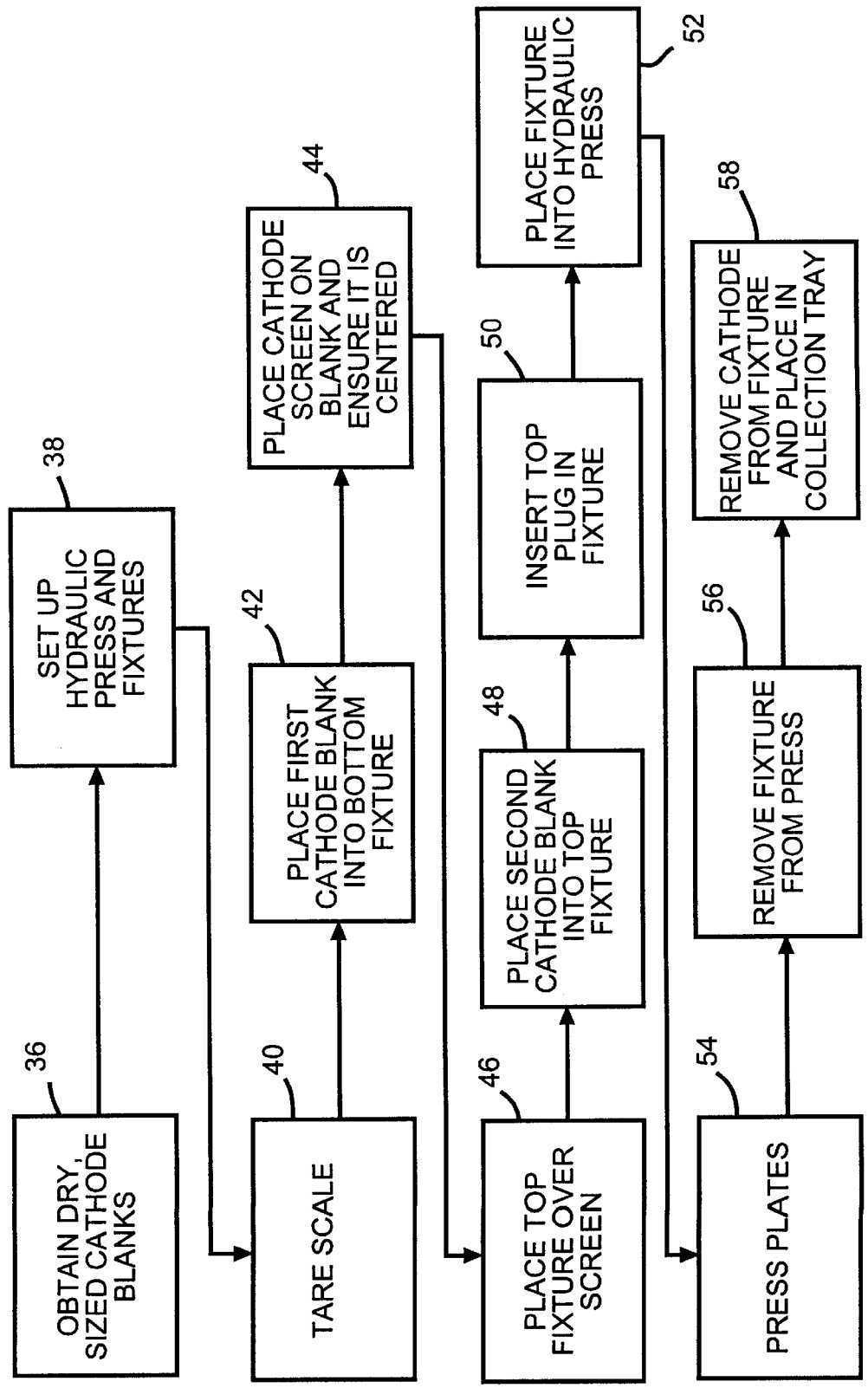
FIG. 2 is a block diagram and flow chart illustrating the steps involved in manufacturing an electrode component for use in an electrochemical cell from a blank of electrode active material made according to the steps illustrated in FIG. 1.

As illustrated in the block diagram flow chart shown in FIG. 2, during the electrode pressing process, dry electrode blanks from step 28 (FIG. 1) are obtained during step 36 for operation thereon. A hydraulic press having platens or fixtures is provided at 38. Receptacle cups for the punched electrode blanks are weighted on a tare scale during step 40 and as a quality control check, selected ones of the blanks are weighted in insure cross-sectional uniformity. To build a cathode component, a first blank is placed in a bottom fixture during step 42 and a current collector, such as an expanded metal screen, is placed on top of the blank during step 44. A top press fixture is then positioned on the bottom fixture and over the current collector screen as indicated at 46. This fixture receives a second shaped electrode blank during step 48 followed by a top plug during step 50 which closes the fixture assembly. The fixture assembly is then inserted into the hydraulic press, as indicated at 52, which compresses the two electrode blanks together 54 with the current collector sandwiched therebetween to form the electrode component as a laminate.

Following the pressing step, the fixture assembly is removed from the press during step 56 and the electrode component is separated from the press fixture and placed into a collection tray during step 58. The electrode component can then be stored for later use, or the electrode can be incorporated into a high energy density primary or secondary electrochemical cell, as is well known to those of ordinary skill in the art.

In that respect, a cathode component prepared by the method of the present invention can be used, as for example, in a nonaqueous electrochemical cell as described in U.S. Pat. No. 4,830,940 to Keister et. al., which patent is assigned to the assignee of the present invention and incorporated herein by reference. The electrochemical cell can also contain an anode of a metal selected from Group IA of the Periodic Table of Elements, including lithium, sodium, potassium, etc., preferably lithium, and their alloys and intermetallic compounds, for example Li—Si, Li—Ai, Li—B and Li—Si—B alloys and intermetallic compounds. The form of the anode may vary, but typically the anode is in the form of a thin sheet or foil of the anode metal, and a current collector having an extended tab or lead affixed to the anode sheet or foil.

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

A suitable electrolyte for a primary electrochemical cell has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL) and N-methyl-pyrrolidinone (NMP) and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, pitch carbon, synthetic carbon, mesocarbon microbeads, and mixtures thereof) which are capable of reversibly retaining the lithium species, is preferred. Graphite is particularly preferred due to its relatively high lithium-retention capacity.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), a polyamide or a polyimide, and mixtures thereof. This active admixture is contacted to a metallic current collector usually made from a thin foil of copper, nickel, nickel plated steel, stainless steel or titanium. Suitable conductive diluents include acetylene black, carbon black and/or graphite. Metals such as nickel, aluminum, titanium and stainless steel in powder form are also useful as conductive diluents when mixed with the above listed active materials. The cathode electrode further comprises a fluororesin binder, preferably in a powder form, such as PTFE, PVDF, ETFE, a polyamide or a polyimide, and mixtures thereof.

The preferred electrolyte for the secondary cell includes an alkali metal salt dissolved in a quaternary, nonaqueous carbonate solvent mixture consisting of about 10% to about 50% ethylene carbonate, about 5% to about 75% dimethyl carbonate, about 5% to about 50% ethylmethyl carbonate and about 3% to about 45% diethyl carbonate, by volume. For a more thorough discussion of such an electrolyte, reference is made to U.S. application Ser. No. 09/133,799, filed Aug. 13, 1998, which is assigned to the assignee of the present invention and incorporated hereby by reference.

The preferred form of the primary and the secondary electrochemical cell is a case-negative design wherein the anode/cathode couple is inserted into a conductive metal casing such that the casing is connected to the anode current collector, as is well known to those skilled in the art. A preferred material for the casing is titanium although stainless steel, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE

Silver vanadium oxide (SVO) of an average particle size of about 20 μm produced in a Union Process Attritor Mixer Model 1-S was mixed in a Ross Power Mixer Model PD-2 with Ketjenblack® carbon, graphite and polytetrafluoroethylene (PTFE) in excess Isopar G solvent. The mass ratio of the SVO/PTFE/carbon/graphite was about 94/3/1/2. The Isopar G solvent was vacuum filtered from the mixture so that the final solvent content was about 0.27 cc to about 0.30 cc Isopar G/gram of solids. The resulting filter cake was broken up, manually homogenized and passed through a Fitzpatrick L83 Chilsonator to form pellets. The pellets were fed through a continuous three-roll mill to form a tape of SVO sheet. The sequential roll mill gaps were set at 0.021", 0.019" and 0.018". The thusly formed sheet tape was cut into 3"×5" blanks which were subsequently passed through a 0.015" roll mill then a 0.01125" roll mill in a secondary calendaring step. These secondary passes were in varying directions relative to the initial sequential mills constituting the first calendar step, and are set forth in Table 1.

TABLE 1

| Direction Through 0.015" or 0.01125" Gap Secondary Rollers Relative to Initial Roll Direction | |
|---|---|
| 0.015" Mill | 0.01125" Mill |
| 0° | 0° |
| 0° | 90° |
| 0° | 180° |
| 90° | 0° |
| 90° | 90° |
| 90° | 180° |
| 90° | 270° |
| 180° | 0° |
| 180° | 90° |
| 180° | 180° |

Figure 3:
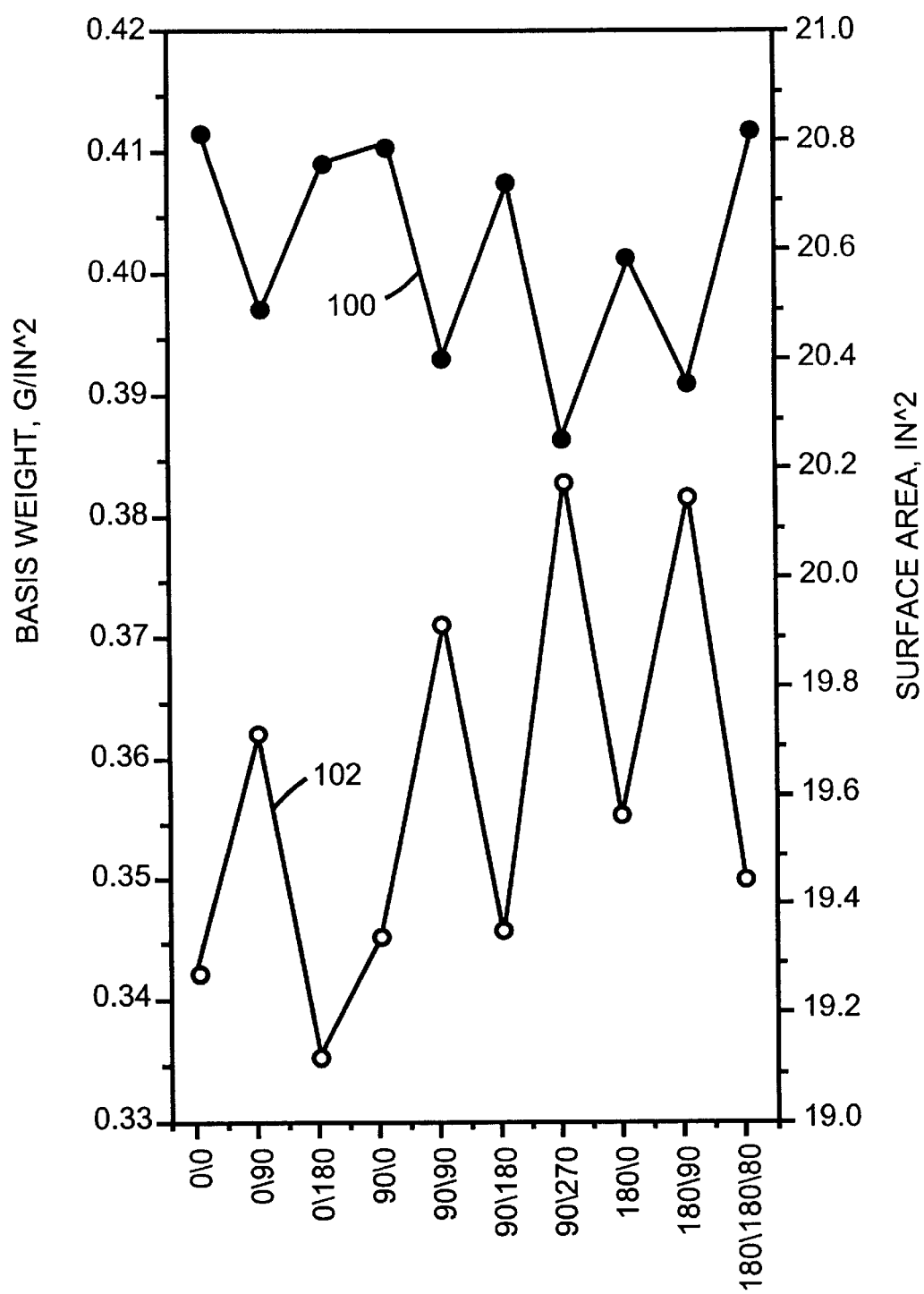
FIG. 3 is a graph illustrating the relationship between basis weight and surface area with respect to coupon feed direction.

The rolled blanks were measured for length, width, thickness and weight. The basis weights determined from these samples depended strongly on the rotation of the blanks prior to passing through the secondary mills. The blanks milled orthogonally or at a 180° rotation relative to the initial forming mills yielded the lowest basis weights. FIG. 3 presents the surface areas and basis weights obtained for the various mill orientations.

In particular, curve 100 was constructed from the basis weight of the primary and secondary calendering of the blanks and curve 102 was constructed from the surface area of those blanks. The samples that gave the lowest basis weights also yielded the highest surface areas. The combinations that provided these most desirable results were those that included at least one orthogonal pass in the secondary calendaring step. These data indicate that the PTFE binder in the cathode active admixture is fibrulated to an extent near its maximum if milled too greatly in a single direction. On the other hand, if the electrode structure is processed in a secondary step by being milled in an orthogonal direction or a reverse direction to provide for fibrillation of the PTFE binder in other than the initial direction, that lets the sheet spread in directions transverse to the initial direction to form the low basis weight material according to the present invention.

It is appreciated that various modifications to the inventive concepts described herein may be apparent to those skilled in the art without departing from the spirit and scope of the present invention as defined by the hereinafter appended claims.

What is claimed is:

1. An electrode, which comprises:

a) an electrode active blank characterized as formed from a first structure having been calendered from an electrode active mixture comprising an electrode active material which is capable of intercalation of alkali metal ions and which was mixed with a fluoro-polymeric material in a solvent to form the mixture, the first structure having first and second spaced apart major sides extending to and meeting with a first peripheral edge providing the first structure with a first thickness, wherein the first structure was then subjected to at least one first calendering mill contacting the electrode active mixture in a first direction to form a second structure having the first and the second spaced apart major sides extending to and meeting with a second peripheral edge providing the second structure with a second thickness less than the first thickness of the first structure, and wherein the second structure was then subjected to at least one second calendering mill contacting the electrode active mixture in a second direction to provide for fibrillation of the fluoro-polymeric material in other than the first direction to provide a third structure having the first and the second spaced apart manor sides extending to and meeting with a third peripheral edge of a third thickness less than the second thickness of the second structure, and wherein the solvent was then removed from the electrode active mixture to provide the electrode active blank; and b) a conductive substrate having at least one electrode active blank contacted to at least one of a first and second major surfaces of the conductive substrate.

2. An electrode, which comprises:

a) an electrode active blank characterized as formed from a first structure having been calendered from an electrode active mixture comprising an electrode active material which is capable of intercalation of alkali metal ions and which was mixed with a fluoro-polymeric material in a solvent to form the mixture, the first structure having first and second spaced apart manor sides extending to and meeting with a first peripheral edge providing the first structure with a first thickness, wherein the first structure was then subjected to at least one first calendering mill to form a second structure having the first and the second spaced apart manor sides extending to and meeting with a second peripheral edge providing the second structure with a second thickness less than the first thickness of the first structure, and wherein the second structure was then subjected to at least one second calendering mill contacting the electrode active mixture in a direction substantially orthogonal to or in a reverse direction to that which formed the second structure to provide a third structure having the first and the second spaced apart major sides extending to and meeting with a third peripheral edge having a third thickness less than the second thickness of the second structure, and wherein the solvent was removed from the electrode active mixture to provide the electrode active blank; and b) a conductive substrate having at least one electrode active blank contacted to at least one of a first and second major surfaces of the conductive substrate.

3. The electrode of claim 2 wherein the electrode active mixture comprises from between about 80 weight percent to about 99 weight percent of the electrode active material.

4. The electrode of claim 2 wherein the electrode active material is a metal-containing material.

5. The electrode of claim 2 further comprising a conductor material.

6. The electrode of claim 2 wherein the electrode active mixture comprises about 3 weight percent carbon, about 3 weight percent of the fluoro-polymeric material and about 94 weight percent of the electrode active material comprising a metal-containing material.

7. The electrode of claim 2 wherein the electrode active material is selected from the group consisting of a carbonaceous material, a metal oxide, a metal sulfide, a mixed metal oxides a metal element, and mixtures thereof.

8. The electrode of claim 2 wherein the electrode active material is selected from the group consisting of fluorinated carbon, silver vanadium oxide, copper silver vanadium oxide, manganese dioxide, titanium disulfide, cobalt oxide, nickel oxide, copper sulfide, iron sulfide, iron disulfide, copper vanadium oxide, and mixtures thereof.

9. The electrode of claim 2 wherein the electrode active material is selected from the group consisting of $LiNiO_2$, $LiMn_2O_4$, $LiCoO_2$, $LiCoO_{0.92}Sn_{0.08}O_2$, $LiCo_{1-x}Ni_xO_2$, and mixtures thereof.

10. The electrode of claim 2 wherein the electrode active blank has a thickness in a range of from about 0.004 inches to about 0.020 inches.

11. The electrode of claim 2 wherein at least one electrode active blank is pressed onto each side of the conductive substrate.

12. The electrode of claim 11 wherein the conductive substrate is perforated and the perforations provide for locking the electrode active blanks together.

13. An electrochemical cells which comprises:
  a) a first electrode;
  b) a second, counter electrode, wherein at least one of the first and second electrodes is comprised of:
    i) an electrode active blank characterized as formed from a first structure having been calendered from an electrode active mixture comprising an electrode active material capable of intercalation of alkali metal ions and which was mixed with a fluoro-polymeric material in a solvent to form the mixture, the first structure having first and second spaced apart major sides extending to and meeting with a first peripheral edge providing the first structure with a first thickness, wherein the first structure was then subjected to at least one first calendering mill to form a second structure having the first and the second spaced apart major sides extending to and meeting with a second peripheral edge providing the second structure with a second thickness less than the first thickness of the first structure, and wherein the second structure was subjected to at least one second calendering mill contacting the electrode active mixture in a direction substantially orthogonal to or in a reverse direction to that which formed the second structure to provide a third structure having the first and the second spaced apart major sides extending to and meeting with a third peripheral edge of a third thickness less than the second thickness of the second structure, and wherein the solvent was removed from the electrode active mixture to provide the electrode active blank; and
    ii) a conductive substrate having at least one electrode active blank contacted to at least one of a first and second major surfaces of the conductive substrate; and
  c) an electrolyte activating the first and second electrodes.

14. The electrochemical cell of claim 13 wherein the electrode active mixture comprises from between about 80 weight percent to about 99 weight percent of the electrode active material.

15. The electrochemical cell of claim 13 wherein the electrode active material is a metal-containing material.

16. The electrochemical cell of claim 13 wherein the electrode active mixture further comprises a conductor material.

17. The electrochemical cell of claim 13 wherein the electrode active mixture comprises about 3 weight percent carbon, about 3 weight percent of the fluoro-polymeric material and about 94 weight percent of the electrode active material comprising a metal-containing material.

18. The electrochemical cell of claim 13 wherein the electrode active material is selected from the group consisting of a carbonaceous material, a metal oxide, a metal sulfide, a mixed metal oxides a metal element, and mixtures thereof.

19. The electrochemical cell of claim 13 wherein the electrode active material is selected from the group consisting of fluorinated carbon, silver vanadium oxide, copper silver vanadium oxide, manganese dioxide, titanium disulfide, cobalt oxide, nickel oxide, copper sulfide, iron sulfide, iron disulfide, copper vanadium oxide, and mixtures thereof.

20. The electrochemical cell of claim 13 wherein the electrode active material is selected from the group consisting of $LiNiO_2$, $LiMn_2O_4$, $LiCoO_2$, $LiCoO_{0.92}Sn_{0.08}O_2$, $LiCo_{1-x}Ni_xO_2$, and mixtures thereof.

21. The method of claim 13 wherein the electrode active blank has a thickness in a range of from about 0.004 inches to about 0.020 inches.

22. The electrochemical cell of claim 13 wherein at least one electrode active blank is pressed onto each side of the conductive substrate.

* * * * *